United States Patent [19]

Stangroom

[11] Patent Number: 4,664,236

[45] Date of Patent: May 12, 1987

[54] ELECTRICALLY CONTROLLED, PROGRESSIVE, FRICTIONAL, TORQUE TRANSMITTING DEVICE

[75] Inventor: James E. Stangroom, Sheffield, England

[73] Assignee: ER Fluid Developments Limited, Sheffield, England

[21] Appl. No.: 774,972

[22] Filed: Sep. 11, 1985

[30] Foreign Application Priority Data

Sep. 19, 1984 [GB] United Kingdom ............... 8423691

[51] Int. Cl.⁴ .......................................... F16D 13/08
[52] U.S. Cl. .................................. 192/35; 192/21.5; 192/48.3
[58] Field of Search .................... 192/21.5, 48.7, 48.2, 192/48.3, 36, 35

[56] References Cited

U.S. PATENT DOCUMENTS

| 2,523,772 | 9/1950 | McGibbon et al. | 192/35 |
| 4,201,281 | 5/1980 | MacDonald | 192/48.3 |
| 4,444,298 | 4/1984 | Stangroom | 192/21.5 |

Primary Examiner—George H. Krizmanich
Attorney, Agent, or Firm—Trexler, Bushnell, Giangiorgi & Blackstone, Ltd.

[57] ABSTRACT

An electrically controlled, progressive, frictional, torque transmitting device comprises a rotary element 1, 2, a proportion of the rotary power available from the rotary element 1, 2, being used, under the control of a direct electrical signal, to determine the degree of engagement of a frictional device 3, and hence the torque transmitted or absorbed by the torque transmitting device, thereby avoiding the requirement for an additional power source to activate the frictional device whole.

12 Claims, 9 Drawing Figures

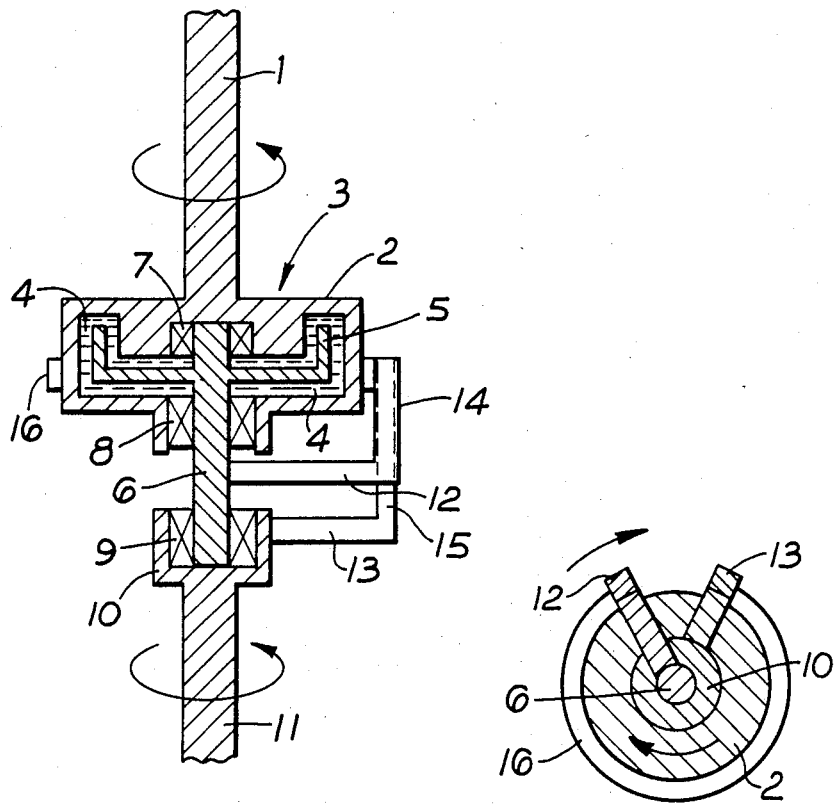
Fig. 1
Fig. 2
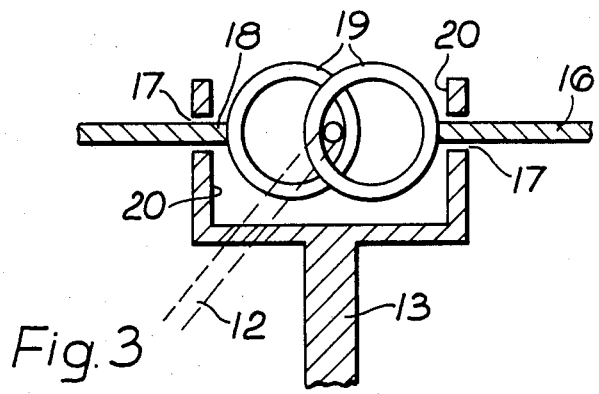
Fig. 3

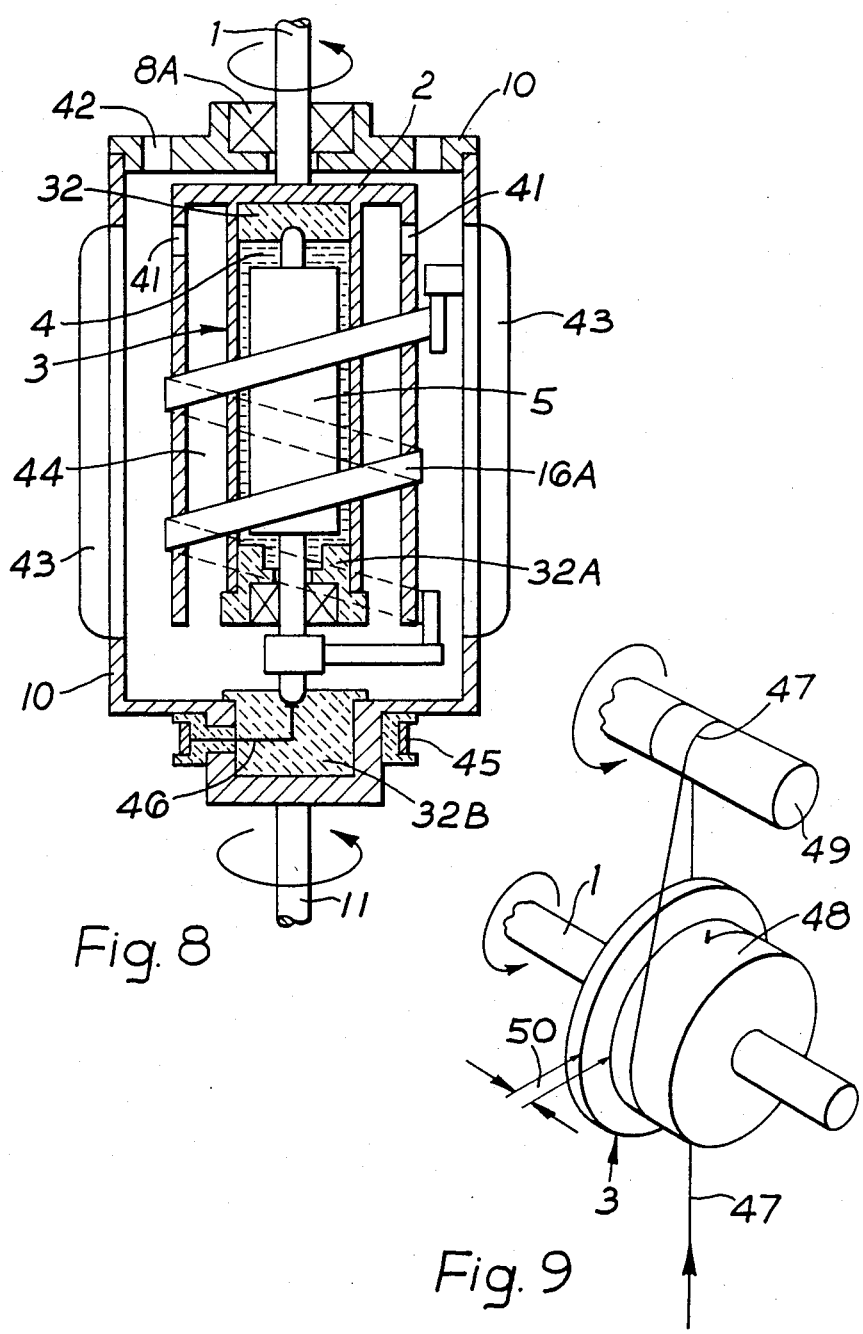

ELECTRICALLY CONTROLLED, PROGRESSIVE, FRICTIONAL, TORQUE TRANSMITTING DEVICE

This invention relates to an electrically controlled, progressive, frictional torque transmitting device.

Frictional clutches and brakes are very widely used; those used in cars are probably the most familiar examples. Essentially, these consist of two elements which are brought into frictional contact by a source of mechanical power which is quite distinct from the mechanical power which is transmitted in a clutch or absorbed in a brake. Thus, in a car clutch, the rotary power through the clutch is provided by the engine; the power to bring the clutch plates into contact is provided by the driver's leg, usually stored in springs. The need to provide an extra power source, over and above the main power input, leads to a complex system, especially when the clutch or brake is to be controlled by low power electrical signals. Leaving aside 'indirect' systems in which these signals control a secondary power source, which in turn operates the main clutch, there are five main systems known from prior art in which a clutch or brake can be directly controlled electrically:

(a) Electromagnetic Clutches. In these, an electric current generates a magnetic field in a coil, which pulls an armature carrying one frictional element into contact with the second frictional element. Since the force on the armature increases very sharply as the armature approaches the coil, it is very difficult to prevent such clutches and brakes having a very sudden action; there is no possibility of progressive application of the torque, as in a car clutch. Hence such devices can only be used to drive small mechanisms in which inertia effects are unimportant.

(b) Wrapped Spring Clutches. In these, a spiral spring is wrapped around one cylindrical element, but does not come into contact with it until the magnetic field of a solenoid is applied. At this point, friction between the cylinder and the spring causes the latter to tighten around the former, thus giving a positive drive. This device, like the electromagnetic clutch, is essentially an 'on-off' system, which offers no possibility of controlled, progressive application.

(c) Eddy-Current Clutches. In these, eddy currents are induced in a rotating conductor by an applied magnetic field. The magnetic field arising from these currents interacts with the applied field to oppose the rotation of 'slip'. Clearly the latter can never be reduced to zero, however, and so such devices can never provide loss-free drives, unlike friction clutches. In addition, large currents and coils are required to generate the fields required.

(d) Magnetic Powder Clutches. In these, a magnetic powder, which may be suspended in a liquid, is trapped between the two elements of a clutch or brake. Application of a magnetic field causes the magnetic particles to adhere to each other, and to the driving and driven members, thus increasing the frictional force between them.

(e) Clutches based on Electro-Rheological Fluids. Conceptually, these are similar to magnetic powder clutches. However, the particles in an Electro-Rheological (ER) fluid do not respond to magnetic fields, but rather to electrical fields.

Unlike systems (a), (b) and (c), systems (d) and (e) offer the possibility of progressive control of the torque, in response to variations of the current [systems (c) and (d)] or the electric field [system (e)]. The power requirements of all three are related to the physical size of the device, and hence to the torque transmitted. This is particularly serious with magnetically operated devices, since the required current unavoidably leads to heat generation. As a result, the input electrical signal to such devices must itself represent a significant power input. Eddy current devices, having the additional disadvantage of inevitable losses in the drive itself, will not be further considered. In ER fluid devices, leakage currents are invariably observed, and these may be large enough to present a serious problem. On the other hand, ER fluids have the considerable advantage of very rapid response to changes in the applied field, and devices based upon them do not need heavy and expensive coils.

According to the present invention there is provided an electrically controlled, progressive, frictional, torque transmitting device comprising a rotary element, with a proportion of the rotary power available from the rotary element being used, under the control of a direct electrical signal, to determine the degree of engagement of a frictional device, and hence the torque transmitted or absorbed by the device as a whole.

The amount of power derived from rotation of the rotary element is determined by the (relatively small) electrical signals, and hence the degree of engagement of the frictional device, can be controlled by rapid and continuous electrical signal variation. Such a system is therefore ideally suited to the control of torque, or parameters which can be derived from torque, such as speed or position, in response to an external signal, in, for example, a closed-loop control system.

In accordance with a preferred feature of the invention, the device is servo operable by an electro-rheological device, although similar operation by a magnetic powder or eddy current device is not excluded.

The properties of electro-rheological (ER) fluids are well known. Briefly, ER fluids are suspensions of solid particles in a base liquid, which normally show Newtonian flow characteristics (viscosity $\mu$), but when exposed to an electric field, develop a yield-point (Y) which ca be controlled, instantaneously and reversibly, by the field. Previously, proposals have been made to use ER fluids in electrically controlled clutches, and two basic configurations are known, namely a tubular type and a flat-plate type. Both forms lend themselves to multiple-element design, and have considerable technological potential in their own rights. However, with present ER fluids, there are also significant problems. The calculation below is based on the assumption of (N) discs in a flat-plate clutch, each having a radius (R), with a gap (h) between the plates. Similar calculations can carried out for tubular clutches.

$$\text{Torque with field applied } (T_f) = \frac{4\pi R^3 Y.N}{3}$$

$$\text{Torque with zero field } (T_o) = \frac{\pi R^4 \mu W.N}{h}$$

($W$ = Angular Velocity)

$$\text{Hence, ratio } T_f/T_o = \frac{4Yh}{3R\mu W}$$

Notice that is assumed that both sides of the discs are active. It is clearly important that the ratio $T_f/T_o$ be as high as possible, not only for simple performance characteristics but also to minimise the heat input to the fluid in the disengaged condition. However, in the final equation, Y and are specified by the fluid. W will be specified by the mechanical requirements of the system, and h can only have a fairly narrow range of values if the voltage to the clutch is not to be unrealistically high. The only means available to raise the ratio $T_f/T_o$ is, therefore, to reduce R. This brings two disadvantages. Firstly, to achieve a given absolute value of $T_f$, which will again be specified, since Y is determined, the number of discs must be increased. This in itself may prove inconvenient. Furthermore, the amount of active surface area in this clutch is clearly 2 $R^2N$ (Plates active both sides). It therefore follows that the smaller the value of R, to achieve a good $T_f/T_o$ ratio, the higher the current.

These considerations have so far limited the use of ER clutches, in spite of their real advantages over more conventional clutches. Thus, unlike conventional dry-plate clutches, which require powerful springs and correspondingly powerful means of overcoming them, ER clutches are simple, and easily controlled electrically. Other conventional clutches, such as solenoid operated clutches are difficult to programme and tend to be an on/off devices which, when attached to high inertia loads, introduce very high stresses into the transmission—while by contrast ER clutches can be progressive.

Ideally, ER fluids themselves should be further developed to give higher values of Y, lower values of $\mu$, and greater operating temperature range; but very considerable improvements, however would be needed. In many applications, it is the geometrical considerations, outlined above, and the corresponding heat generated by no-field drag, and, to a lesser extent, by the input electrical control power, which have restricted the range of application of ER clutches. Very many clutch applications require only a limited range of ambient temperatures, providing that the inherent heat output can be minimised.

In accordance with a preferred embodiment, the frictional device is a frictional torque amplifier.

Various other advantageous features, some of independent significance, will appear by way of illustrative example only from the following detailed description of the drawings, in which:

FIG. 1 is a diagrammatic sectional view through a first embodiment of ER controlled device in accordance with the invention;

FIG. 2 is a composite end view of the device of FIG. 1;

FIG. 3 is a sectional diagrammatic view, to a larger scale, of a modified portion of the embodiment of FIGS. 1 and 2; and FIGS. 4 to 8 are axial sectional views through five further embodiments of ER controlled devices.

Figure 4:
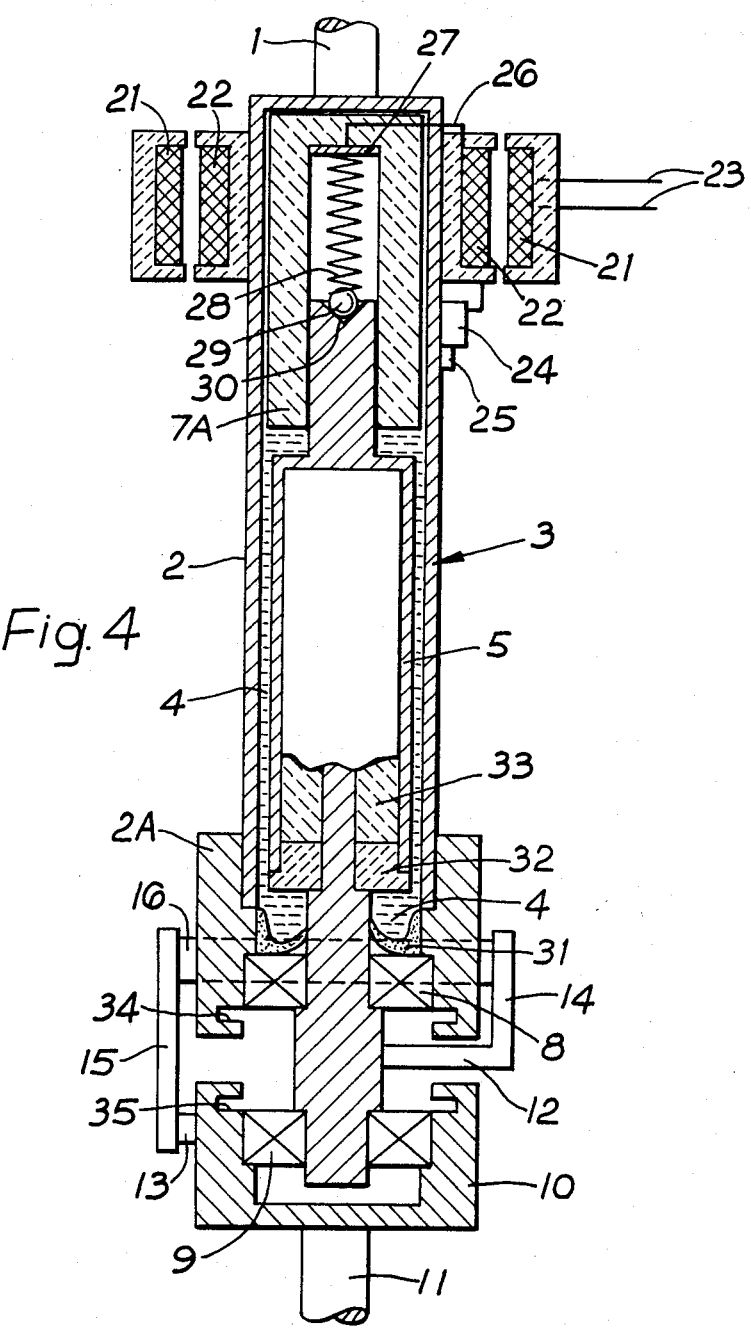

In FIG. 1 it is assumed that an upper, input shaft 1, is driven in the direction indicated, the shaft 1 carrying an enlarged diameter housing 2, which forms one element of an ER clutch 3, the ER fluid being indicated at 4. The clutch 3 can be of any convenient form, but the example illustrated in FIG. 1 is a combination of plate and tubular forms, active on all surfaces. The clutch 3 has a driven element 5 connected to a short shaft 6, which is rotatable in bearings 7 and 8, in the housing 2. The bearings 7 and 8 must be sealed against the ER fluid 4 and, in practice, some means must be provided to take up any expansion of the ER fluid in the clutch. The shaft 6 is co-axial with the shaft 1, projects beyond the housing 2 and is rotatable in a third bearing 9, located in a housing 10 on the end of a lower, output shaft 11. From the shaft 6 projectss a radial arm 12, while a second radial arm 13 projects from the housing 10. The radial arms 12 and 13, carry respective axial extensions 14 and 15 which project, side by side, over the housing 2. A thin steel band 16, connects the axial extensions 14 and 15, passing around the housing 2.

The operation of the device can be appreciated from FIG. 2. When the input shaft 1 is driven, the clutch component 5 and hence the shaft 6, will experience a torque, which will tend to drag the radial arm 12 around, in the direction of rotation. If no electrical field is applied to the ER fluid 4, this torque will be small, and there is no difficulty in arranging for the drag to be resisted by the inherent springyness in the steel band 16, and the torque on the shaft 6 cannot reach the output shaft 11, since they are joined only by the bearing 9. When however, a voltage is applied to the ER fluid 4, the torque on the shaft 6 is increased, so that the spring resistance of the band 16 is overcome—to an extent which depends upon the applied voltage. The arm 12 therefore rotates towards the (stationary) arm 13, tightening the band 16 around the housing 2. Frictional forces between the band 16 and the housing 2 amplify the torque due to the ER clutch 3, thus transmitting a magnified torque to the arm 13, and hence to the shaft 11. In such a system, the torque output is a linear function of the torque input, and is therefore determined by the torque from the ER clutch 3. The degree of amplification is determined by the coefficient of friction between the band 16 and the housing 2. Taking a typical value of 0.2 for the friction coefficient, for a single turn around the housing 2 indicated in FIGS. 1 and 2, a torque amplification of 3.5 is achieved. If this is insufficient, two turns of the band 14 around the housing 2 will give a factor of 12, and three turns a factor of 43.

It is clearly possible to arrange the separate components in various ways, and to incorporate various refinements and modifications. For example, a separate spring might be used, instead of relying on the inherent springy properties of the steel band 16. It may be found that the tensile strength of the steel band 16 which must be thin in order to bend around the housing 2, will be insufficient to transmit the torque. In such cases, the steel band 16 may be replaced by a jointed chain, similar to that of a tank track, and provided with wearing surfaces machined to the radius of the housing 2. To protect the ER fluid 4 from heat generated by friction of the band 16 on the housing 2, an outer rubbing ring could be fixed on the latter, spaced to allow air circulation.

As described above, the device will only transmit rotation in one direction. If bi-directional operation is required, the modification shown in FIG. 3 can be used. Here, the end of the arm 13 is bifurcated, and has two slots 17 through which ends 18 of the band 16 are passed; a ring 19 is attached to each end 18, which rings 19 are arranged to overlap, and the axial end of the arm 12 is passed through both. Displacement of the arm 12 in either direction pulls one end of the band 16 in the normal manner, but the main torque is transmitted to the arm 13 by one or other of the rings 19 abutting against a wall 20 of their slots 17 in the bifurcation of the arm 13.

The simple arm 13 can be replaced by a more complex gear or lever linkage if required; the torque output could be further magnified thereby, although at the cost of increased friction and reduced frequency response.

Two important features of this system should be noted. It can readily be arranged, by suitable choice of the stiffness of the friction band 16, or of a withdrawing spring between the arms 12 and 13, that the band 16 does not touch the housing 2 when there is no electrical field applied. This will only be practicable, however, when the drag of the ER clutch 3 with no field applied is small compared with the torque transmitted with a field. To secure this, the proportions of the ER clutch should be carefully chosen, and every effort made to minimise friction in seals, bearings, etc. By so doing, both wear on the band 16 and drag in the disengaged condition are greatly reduced, at the cost of having to apply a small field before the clutch starts to engage. Once the band 16 is in contact with the housing 2, however, the natural frequency of the system, which will be determined by the stiffness of the band 16 in tension, will be high. This device will therefore be capable of taking advantage of the high speed of response of ER fluids, once the original 'threshold' level has been passed.

In the drawings no indication has been given of the high voltage connections. Clearly, the high voltage is preferably applied to the driven element 5, with the housing 2 assumed to be earthed. Such high voltage could be applied via a slip-ring on the shaft 6. The high voltage connection brings a disadvantage, in that it must be protected, and there must be a fixed element to hold the connection. This can be avoided, as indicated in the tubular and flat plate ER clutches of FIGS. 4 and 5, respectively, for example by winding many turns of fine wire around the periphery of the housing 2, but avoiding of course the region on which the band 16 is intended to operate. Thus, a primary and stationary coil 21 surrounds a secondary coil 22 wound onto the housing 2. By passing a low-voltage high frequency, oscillating current from leads 23 through the stationary coil 21, a much larger voltage is induced in the secondary, rotating coil 22, proportional to the input voltage. The ends of the rotating coil are connected to a full-wave rectifier 24, an earth connection 25 of which is connected to the housing 2 and a H.T. connection 26 is connected to the driven element 5 via a plate 27, with a compression spring 28 located between the plate 27 and a ball 29 seated in a recess 30 in the portion of shaft 6 located in bearing 7A constituted in this embodiment by a cupped, nylon (trade mark) bush. The two coils 21 and 22 simply function as a step-up transformer. The efficiency, in electrical terms, of such a system will not be very high, due to the unavoidable spatial separation between the two coils, but it can be improved by arranging that the input frequency of the low voltage corresponds to the resonance frequency of the internal coil 22 and capacitance, the latter representing the ER clutch itself. In any case, only low power signals are required to operate the ER clutch 3 so losses will not be serious.

Also shown in the ER, piloted clutch unit of FIG. 4 is a standard oil-seal 31 to protect the bearing 9—with present fluids, the seal 31 must be 'Viton' (Du Pont), since other elastomers are attacked by the fluid. Also shown is a bush 32 of PTFE insulating material, which has been found to be reliable in areas of high electrical stress in contact with ER fluid, with an inner 33 of epoxy resin. The bearings 8 and 10 are retained in a conventional manner by circlips located in grooves 34 and 35 respectively. The housing 2 is illustrated as carrying a press-fit sleeve 2A which is the portion of the housing engageable by the friction band 14.

Figure 5:
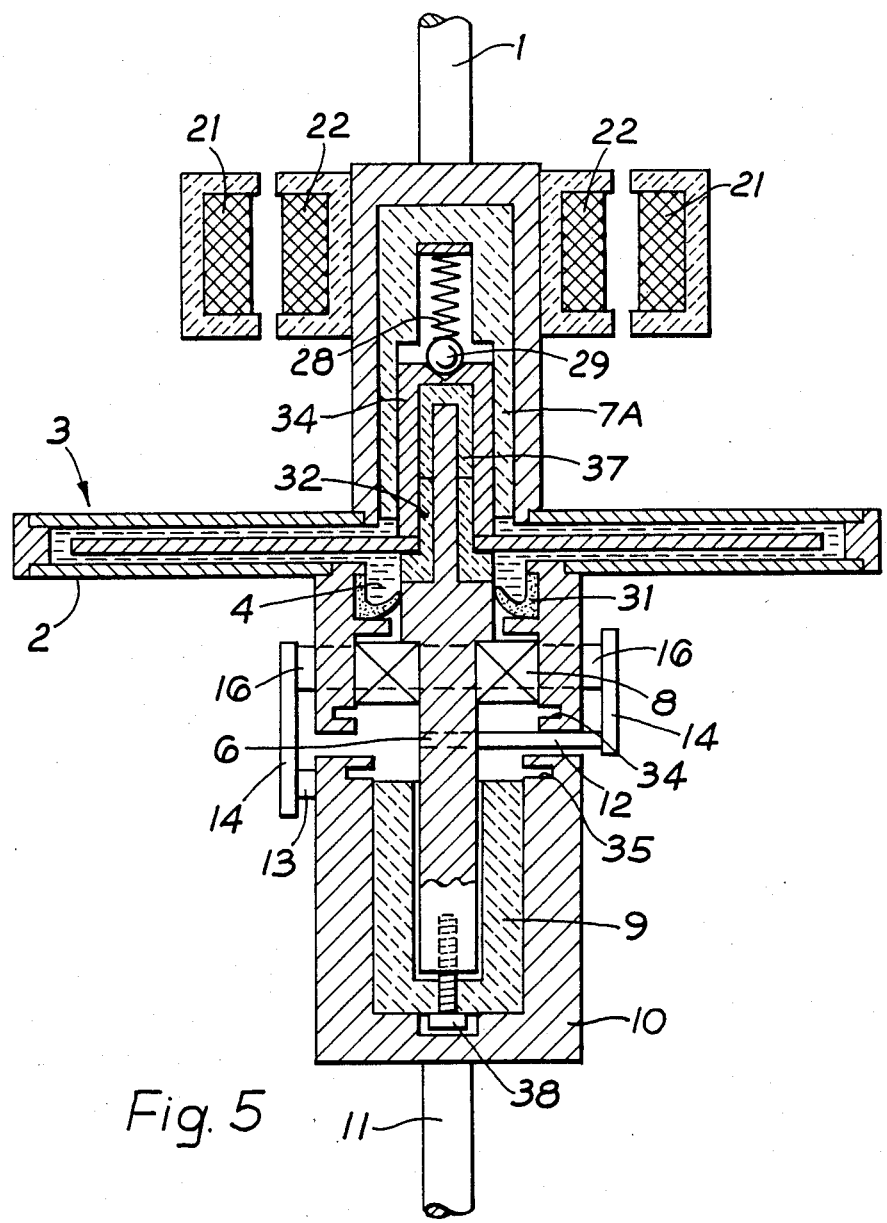

The device of the embodiment of FIGS. 5 is similar to FIG. 4, but adapted to use a flat-plate ER driven clutch element 5 to which is attached a metal sleeve 36 engaged by the ball 29, the sleeve 36 housing an epoxy resin cup 37 and, partially the PTFE bush 32, there being a single, angular contact ball bearing 8 protected by the seal 31, while bearing 9 is in this embodiment constituted by a cupped, nylon (trade mark) bush provided with a retaining screw 38. It will be appreciated that this flat-plate clutch could readily be adapted to a multi-plate form.

Figure 6:
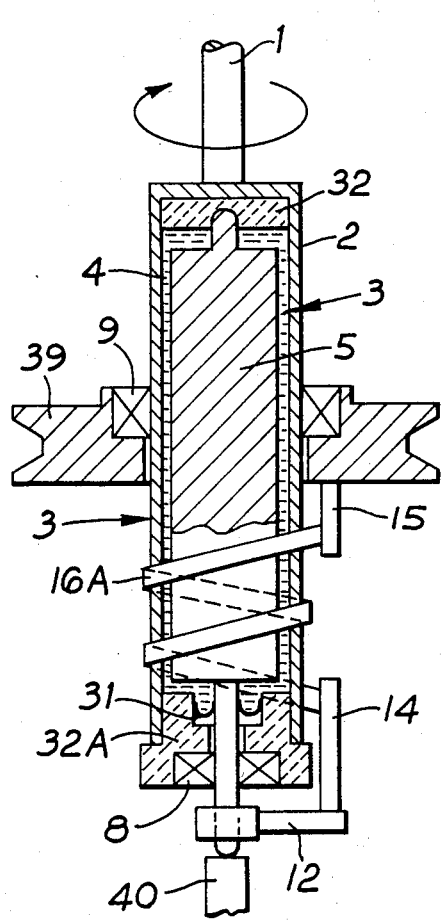
Figure 7:
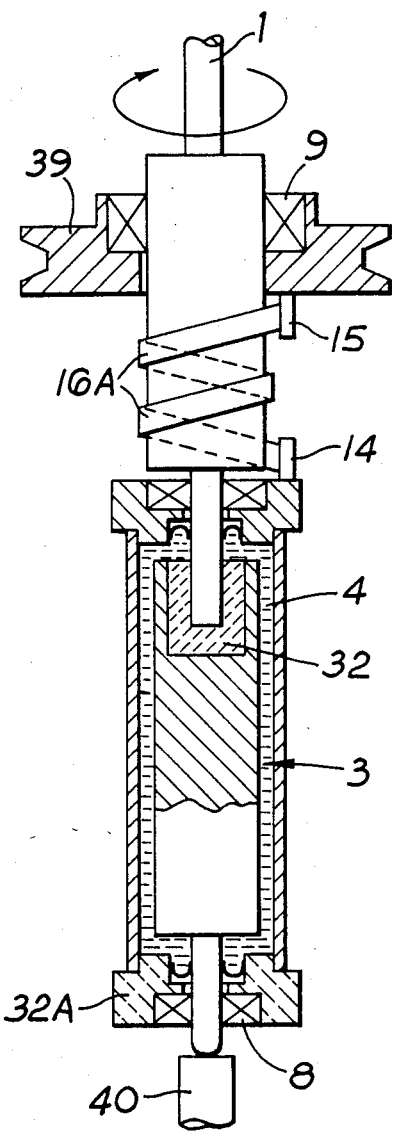

FIGS. 6 and 7 illustrate embodiments of the invention in which the input or output is taken off by a belt pulley 39, (or a gear). It will be apparent that these layouts lead to very simple devices in which the high voltage connections can be easily made via a contact 40. These embodiments also illustrate a multi-wrap band 16A, and a lower insulator 32A.

In FIG. 8, the housing 2 is shown provided with air holes 41, while the housing 10 is extended and enlarged to surround the housing 2, being supported on a bearing 8A on the input shaft 1, whilst being provided with air holes 42 and air scoops 43, to allow air circulation for cooling purposes, a cooling air space 44, a slip ring 45 with an electrical lead 46 passing through insulator 32B, although in this embodiment the ease of introduction of the high voltage signal is sacrificed thereby.

FIG. 9 illustrates yet another embodiment of the basic invention, applied to a clutching device used to pull in a wire or cord 47. The latter is attached to a drum 48, which is part of an ER clutch 3. Application of a field to the ER clutch 3 tightens the cord 47 around a rod 49, which is continuously rotated with the driving member of the ER clutch, conveniently by a belt or gears (not shown) between the two. The tension generated by the ER clutch 3, which can be small, is therefore amplified by friction around the rod 49. It will be seen that this system lends itself to very small devices, which can be closely packed together if required; in this case, the clutch itself is conveniently in the form of a disc, with the voltage applied across gap 50.

What I claim is:

1. A torque transmitting device comprising a first rotary element, a second rotary element, a frictional torque amplifier, and a progressively operable, electro-rheological clutch interposed between said first rotary element and said frictional torque amplifier, said frictional torque amplifier being connected between a predetermined portion of said electrorheological clutch and said second rotary element, and a proportion of the rotary power available from said first rotary element being used, under the control of a direct electrical signal applied to said electro-rheological clutch, to determine the degree of engagement of said frictional torque amplifier with said predetermined portion of said electro-rheological clutch, and hence the torque transmitted or absorbed by said torque transmitting device.

2. A torque transmitting device as claimed in claim 1, wherein said first rotary element comprises a shaft forming one portion of said clutch, and said friction band passes around said portion of said clutch and is frictionally engageable therewith upon application of an electrical signal to said clutch, one end of said band being connected to a driven element of said clutch and the other end to an output shaft of said clutch.

3. A torque transmitting device as claimed in claim 2, wherein a housing is carried by said input shaft, said housing forming one portion of said electro-rheological (ER) clutch, and said driven element is attached to one end of said friction band, which is frictionally engageable with said housing upon application of an electrical field of said (ER) clutch.

4. A torque transmitting device as claimed in claim 3, wherein a first radial arm projects from said driven element, while a second radial arm projects from said housing, axial extensions carried by each arm being connected to opposite ends of said friction band.

5. A torque transmitting device as claimed in claim 3, wherein said friction band is a thin steel band.

6. A frictional device as claimed in claim 6, wherein said friction band passes in multiple turns around said element of the clutch.

7. A frictional device as claimed in claim 2, wherein a secondary coil is provided on one portion of said clutch, whilst a primary and stationary coil, surrounds said secondary coil.

8. A frictional device as claimed in claim 1, wherein an output element of said clutch is constituted by a belt pulley.

9. A torque transmitting device as claimed in claim 1, wherein the frictional torque amplifier comprises a friction band.

10. A torque transmitting device as claimed in claim 9, wherein said friction band passes around a circular external periphery of said predetermined portion of said electro-rheological clutch.

11. A torque transmitting device as claimed in claim 1, wherein said first rotary element is an input shaft.

12. A torque transmitting device as claimed in claim 1, wherein said second rotary element is an output shaft.

* * * * *